May 19, 1964
H. L. ROBINSON
3,133,805
GLASS BEAD MAKING FURNACE
Filed April 26, 1961
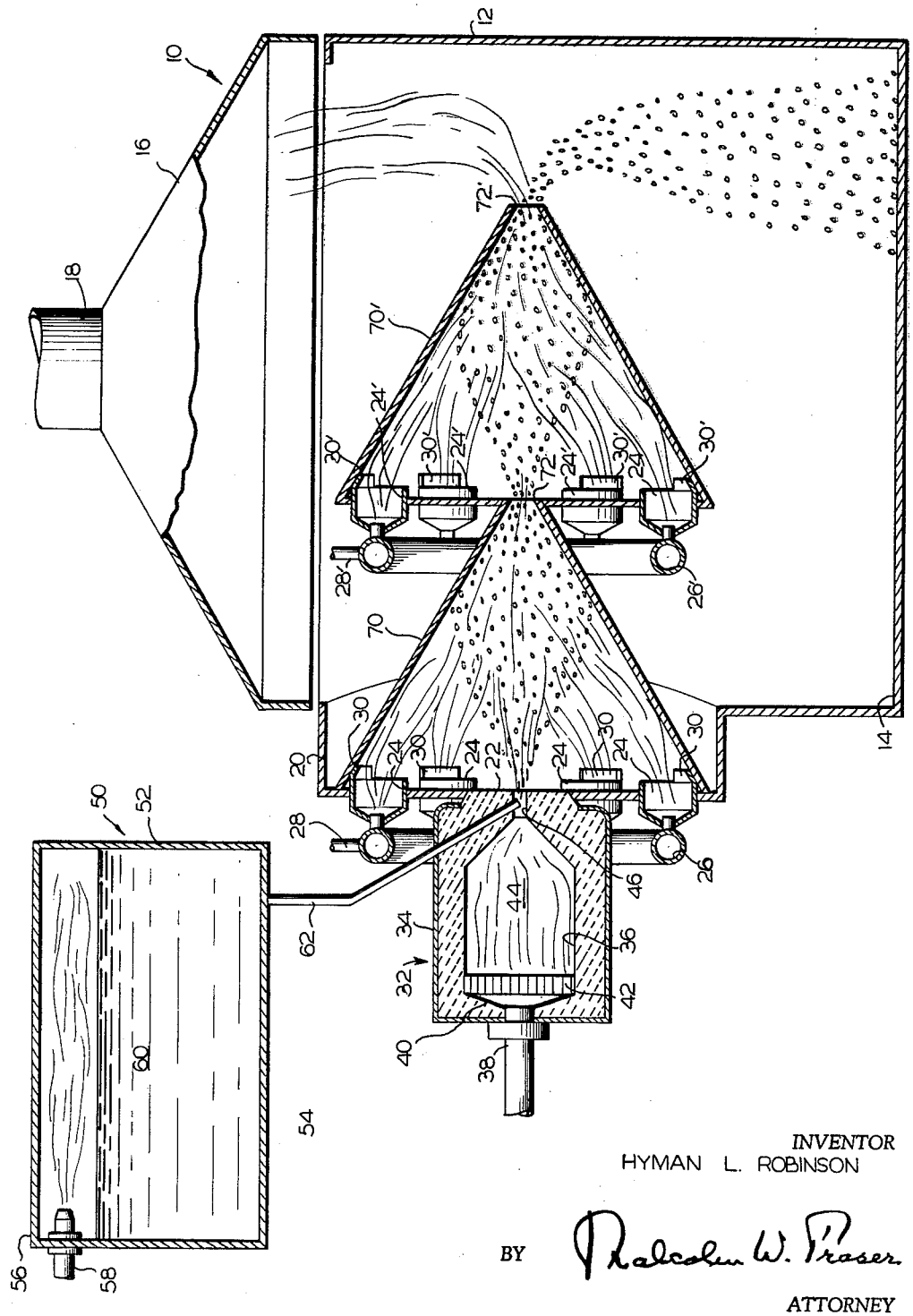
INVENTOR
HYMAN L. ROBINSON
BY *Malcolm W. Fraser*
ATTORNEY

United States Patent Office 3,133,805
Patented May 19, 1964

3,133,805
GLASS BEAD MAKING FURNACE
Hyman Lloyd Robinson, Jackson, Miss., assignor to Cataphote Corporation, Toledo, Ohio, a corporation of Ohio
Filed Apr. 26, 1961, Ser. No. 105,783
3 Claims. (Cl. 65—142)

The present invention relates to an apparatus for producing small glass beads.

It has been found in the production of glass beads made in accordance with prior art method and apparatus that certain quantities of the glass do not form into beads, but rather reach the collection zone in the form of small glass rods and must be discarded as waste material or be remelted. The reason these glass rods are not spherulized is that they have been allowed to cool and solidify too rapidly from the molten state. Therefore the surface tension of the glass has not had an opportunity to cause the rods to become spherulized.

It is the object of the present invention to produce apparatus which may be economically attached to existing glass bead making furnace structures or incorporated into new furnaces for providing heat for sufficient enough periods of time to the small glass rods to allow them to become spherulized.

Another object of the invention is to produce an attachment for glass bead manufacturing furnaces which is easily and cheaply fabricated.

In an embodiment these and other objectives of the invention are achieved by an apparatus comprising a furnace, a primary burner disposed in the wall of the furnace and having a passage communicating with the interior of the furnace, a molten glass supply having communication wtih the passage of the primary burner, a plurality of secondary burners disposed about the primary burner, the secondary burners arranged to direct hot gases toward the interior of the furnace, and a gas deflecting element having an inlet and an outlet and a side wall tapering from the inlet to the outlet, the inlet of the deflecting element being mounted to surround the primary and secondary burners.

A more complete understanding of the invention will be obtained from reading the following detailed description in light of the attached drawing.

In the drawing there is shown a furnace generally indicated by the reference numeral 10 having a vertically extending side wall which may be any desired shape such as round, rectangular, etc. The furnace 10 also includes a bottom wall 14 and a top portion 16 suitably contoured to allow for the concentration and exhaust of combusted gases as through a centrally located exhaust stack 18.

The side wall 12 of the furnace 10 is provided with an outwardly extending portion 20 suitable for housing a primary hot gas inlet nozzle 22 and a set of secondary hot gas or after-burner inlet nozzles 24. In the illustrated embodiment there are six secondary gas inlet nozzles; however, it must be understood that this number may be varied within the spirit of the invention.

The secondary hot gas inlet nozzles 24 are connected to a source of hot gases through an annular manifold 26 and an inlet pipe 28. It will be noted that the secondary hot gas nozzles 24 are each provided with a deflector 30 which functions to cause the respective emergent gas stream to be inwardly and toward a focal point in the interior region of the furnace as will be explained in greater detail hereinafter.

The primary hot gas inlet nozzle 22 comprises the outlet end of a primary burner 32 which is basically a miniature refractory-lined furnace, in which heat is released at high rates and at temperatures of the order of 3000° F. and at velocities as high as 2500 ft./sec.

The burner 32 comprises an outer wall 34 which is lined with any suitable refractory material 36 and has a fuel and air inlet 38. The combustible mixture fed to the inlet 38 enters a plenum chamber 40, through a perforated ceramic plate 42, and into the main combustion chamber 44. The interior walls of the combustion chamber 44 taper at the outlet end to form a blast passage 46 formed in the nozzle 22. The interior walls of the refractory lining 36 attain white-hot incandescence and intense radiation plays from wall-to-wall across the travel of the combustion gases, thereby accelerating the combustion reaction.

The superheated blast issues from the outlet nozzle 22 through the passage 46 and is directed toward the interior of the furnace 10.

A tank or molten glass conditioner 50 is disposed remote from the furnace 10 and comprises a chamber defined by side walls 52, a bottom wall 54, and a top wall 56. A conventional burner 58 is disposed in one of the side walls 52 and is effective to maintain a sufficient temperature within the tank to maintain a reservoir of molten glass 60.

The tank 50 communicates with the burner 32 by means of a pipe 62 which permits molten glass to flow from the tank 50 to the nozzle-end of the burner 32.

The outlet end of the pipe 62 is disposed at a point in the passage 46 such that the glass particles formed by the interaction of the turbulent glass flow through the passage and the glass stream do not "fan out" and clog the passage. Also, the outlet end of the pipe 62 must be disposed at a point where the glass does not freeze at the outlet end thereof.

Disposed within the furnace 10 and about the primary and secondary burner nozzles 22 and 24, respectively, there is a frusto-conically shaped deflecting element 70 which tapers away from the burner nozzles to an open or exit end portion 72. An auxiliary deflecting element 70' having an open or exit end 72' is mounted at the exit end 72 of the aforementioned deflecting element 70. The auxiliary deflecting element 70' is identical with the deflecting element 70 and is provided with an assembly of secondary hot gas inlet nozzles 24' each having a deflector 30'. The nozzles 24' are connected to a source of hot gases through an annular manifold 26' and an inlet pipe 28'.

It will be appreciated that although the nozzles 24 and 24' are illustrated as having deflectors 30 and 30' respectively, these deflectors may not be required in all instances since the deflecting elements 70 and 70' alone may be sufficient to direct the gas flow in the desired direction.

In operation, the temperature of the glass 60 in the container 50 is maintained generally at approximately 2500° F. The molten glass is then caused to flow from the container 50 through pipe 60 to the passage 46. The high velocity turbulent gas stream in the blast passage 46 of the burner 32 functions to atomize the molten glass stream by initially forming the glass into a plurality of small rod-shaped particles. So long as the temperature within the furnace is maintained sufficiently above the softening point of the glass, these small rods quickly become spherulized to form small glass beads, by the surface tension of the glass. The glass is held at an elevated temperature by the combined action of the heat energy produced by the primary burner 32 and the plurality of secondary or after-burners 24. The temperature within the primary burner 32 is typically maintained within a range of from 2500° to 2900° F. while the gas emitted from the after-burners 24 is maintained in the order of 1800° F. The principal function of the primary burner 32 is to atomize the glass, to direct the flow or travel thereof toward the interior of the furnace 10; while the principal function of the after-burners 14 is to maintain the atomized glass at a sufficiently elevated temperature to allow the same to become completely spherulized as well as to provide an extra thrust for propelling the atomized glass away from the nozzle 22.

The deflecting elements 70 and 70' effectively retain the heat energy of the hot gases emitted from the nozzles 22 and 24 and thereby hold the temperature of the glass particles above the softening point of the glass for a sufficient time to allow them to spherulize. Due to the velocity of the particles within the zones defined by the deflecting elements 70 and 70', particles which contact the interior surfaces of the elements do not adhere thereto but actually roll along the surface and are eventually directed back into the main gas stream.

As soon as the spherulized glass beads lose their forward momentum caused by the combined action of the burners 32, 24 and 25' and after they have passed through the outlet or exit opening 72', they drop toward the bottom of the furnace 10 and in falling pass through zones of relatively lower temperature. The glass beads thereupon solidify and are collected at the bottom wall 14 of the furnace 10. The exhaust gases from the furnace 10 are removed therefrom through the outlet stack 18.

While I have described a preferred form of the invention, it will be understood that various modifications and changes therein may be made within the spirit of the invention or the scope of the appended claims.

I claim:

1. Apparatus for producing small glass beads comprising a bead collecting chamber, means defining a primary hot gas inlet passage into said chamber, a molten glass supply means, conduit means communicating at one end with said molten glass supply means for conducting a molten stream therefrom and opening at the other end into said hot gas inlet passage, a set of secondary hot gas inlet means opening into said chamber adjacent said primary hot gas inlet passage, and a tapering deflector hood having an unrestricted interior zone positioned in said chamber to receive gases and suspended objects therein from said primary and secondary hot gas inlets, said deflector element communicating with said chamber through a restricted outlet opening remote from said hot gas inlets.

2. Apparatus for producing small glass beads as defined in claim 1 including at least one further tapering deflector hood positioned to receive gases and suspended objects therein from the outlet opening of the first mentioned hood, said further deflector hood communicating with said chamber through a restricted outlet opening remote from the inlet thereto from the first mentioned hood.

3. Apparatus for producing small glass beads as defined in claim 2 including a further set of secondary hot gas inlet means opening into said further deflector hood adjacent the inlet thereto from the first mentioned hood.

References Cited in the file of this patent

UNITED STATES PATENTS

| | | |
|---|---|---|
| 468,216 | Birge | Feb. 2, 1892 |
| 2,578,101 | Stalego | Dec. 11, 1951 |
| 2,619,776 | Potters | Dec. 2, 1952 |
| 2,626,484 | Stalego | Jan. 27, 1953 |
| 2,739,348 | Rayburn | Mar. 27, 1956 |
| 3,013,299 | Owens | Dec. 9, 1961 |
| 3,015,127 | Stalego | Jan. 2, 1962 |